United States Patent [19]

Marquez

[11] Patent Number: 5,154,113
[45] Date of Patent: Oct. 13, 1992

[54] POPCORN POPPING AND DISPENSING APPARATUS

[76] Inventor: Severo L. Marquez, 291 W. 49th St., Hialeah, Fla. 33012

[21] Appl. No.: 840,005

[22] Filed: Feb. 24, 1992

[51] Int. Cl.[5] .............................................. A23L 1/18
[52] U.S. Cl. .................................. 99/323.9; 99/323.5; 99/357
[58] Field of Search .................. 99/323.5, 323.6, 323.7, 99/323.8, 323.9, 323.11, 483, 339, 340, 357; 34/10, 57 A, 233; 219/400

[56] References Cited

U.S. PATENT DOCUMENTS

| | | | |
|---|---|---|---|
| 3,059,567 | 10/1962 | Lindemann | 99/323.11 |
| 3,570,388 | 3/1971 | Gottlieb | 99/323.5 |
| 4,072,091 | 2/1978 | Richardson | 99/323.11 |
| 4,120,236 | 10/1978 | Blomberg | 99/323.9 |
| 4,417,505 | 11/1983 | Pietrobelli | 99/323.6 |
| 4,494,314 | 1/1985 | Gell, Jr. | 34/10 |
| 4,512,247 | 4/1985 | Friedman | 99/323.9 |
| 4,702,158 | 10/1987 | Ishihara | 219/400 |
| 4,727,798 | 3/1988 | Nakamura | 99/323.6 |
| 4,748,903 | 6/1988 | Fereshetian | 99/340 |
| 4,996,911 | 3/1991 | Sherman | 99/323.8 |

FOREIGN PATENT DOCUMENTS 0265361 4/1988 European Pat. Off. ........... 99/323.6

Primary Examiner—Timothy F. Simone
Attorney, Agent, or Firm—Malloy, Downey & Malloy

[57] ABSTRACT

A popcorn popping and dispensing apparatus adapted to be used in combination with a hot air source, the apparatus including a popping chamber having a base structured and disposed to be attached to the hot air source and including a centrally disposed opening therethrough to define an air nozzle and allow passage of forced hot air through from the hot air source into an interior of the popping chamber. The popping chamber further includes a top having a neck portion with an open distal end defining a drop chute structured and disposed for passage of popping corn kernels therethrough and into the interior of the popping chamber for exposure to the forced hot air and subsequent popping, and includes a surrounding side wall structure having a discharge chute attached to and extending angularly downward from an upper portion thereof so as to allow passage of popped popcorn therethrough and out from an open end thereof, and a cleaning chute attached to and extending angularly upward from a lower portion thereof so as to facilitate the insertion of cleaning instruments therethrough and into the interior of the popping chamber for cleaning thereof.

11 Claims, 2 Drawing Sheets

POPCORN POPPING AND DISPENSING APPARATUS

BACKGROUND OF THE INVENTION

1. Field of the Invention

This invention relates to a popcorn popping and dispensing apparatus adapted for use in combination with a hot air source, the apparatus being structured and disposed to be insulated from heat loss, be capable of unmanned, coined operation, and allow for facilitated cleaning thereof, thereby providing a highly effective, easy to maintain, and easily regulated popping and dispensing apparatus.

2. Description of the Prior Art

Popcorn is a highly enjoyable and often consumed snack food. Although it may be popped in a buttered pan or in a microwave, air popped popcorn has been thought to be the most flavorful and low in fat popcorn. Accordingly, there have been numerous types of home air poppers to meet this need. When popping popcorn for commercial situations, however, large containers are commonly employed, wherein the popcorn may be contained and dispensed by an attendant. Unfortunately, these types of popping apparatuses require a vendor to dispense the popcorn and, as a result of the often elevated popping means are difficult to clean and load. As a result, it would be highly beneficial and desirous to provide a popcorn popping and dispensing apparatus, which while being useful for private use, may be highly useful in a commercial situation wherein an individual may, by inserting money and activating a solenoid switch, cause a predetermined quantity of popcorn to be popped and dispensed. Such an apparatus will assure fresh popcorn to the individual consumer, and will minimize the attendant requirements. Additionally, it may be easily cleaned to maintain a high degree of sanitary conditions and prevent non-popping kernels from remaining in the apparatus and potentially burn.

SUMMARY OF THE INVENTION

The present invention is directed towards a popcorn popping and dispensing apparatus adapted to be used in combination with a hot air source. The apparatus includes primarily a popping chamber having a base, a top, and a surrounding side wall structure. The base includes mounting means adapted to facilitate the attachment of the hot air source therethrough. Further included in the base is an opening which is centrally disposed therethrough to define an air nozzle. The air nozzle is positioned to allow passage of forced hot air therethrough from the hot air source into an interior of the popping chamber. Extending from the top of the popping chamber is a hollow neck portion. The hollow neck portion has an open distal end which defines a drop chute where through popping corn kernels may pass into the interior of the popping chamber for exposure to the forced hot air and subsequent popping thereof. Further, the popping chamber includes a surrounding side wall structure. Attached to and extending angularly downward from an upper portion of the side wall structure is a discharge chute. The discharge chute is structured and disposed to allow passage of popped popcorn therethrough and out from an open end thereof for dispensing to a consumer. Extending angularly upward from a lower portion of the side wall structure is a cleaning chute. The cleaning chute which is sealed when the apparatus is in use, is structured and disposed to facilitate insertion of cleaning instruments, such as a vacuum tube, therethrough and into said interior of the popping chamber for cleaning thereof.

It is an object of the present invention to provide an efficient and effective means of popping popcorn utilizing hot air.

Yet another object of the present invention is to provide a popcorn popping and dispensing means which may be coin operated, thereby eliminating the requirement for manned dispensing.

Still another object of the present invention is to provide a popcorn popping and dispensing apparatus which will be easy to clean without necessitating the disassembling of the entire apparatus.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DESCRIPTION OF THE PREFERRED EMBODIMENT

As detailed throughout FIGS. 1–4, the present invention is directed towards a popcorn popping and dispensing apparatus, generally indicated as 10. The popcorn popping and dispensing apparatus 10 is structured to be easily used and cleaned, and easily adapted for unmanned, coined operation.

Figure 1:
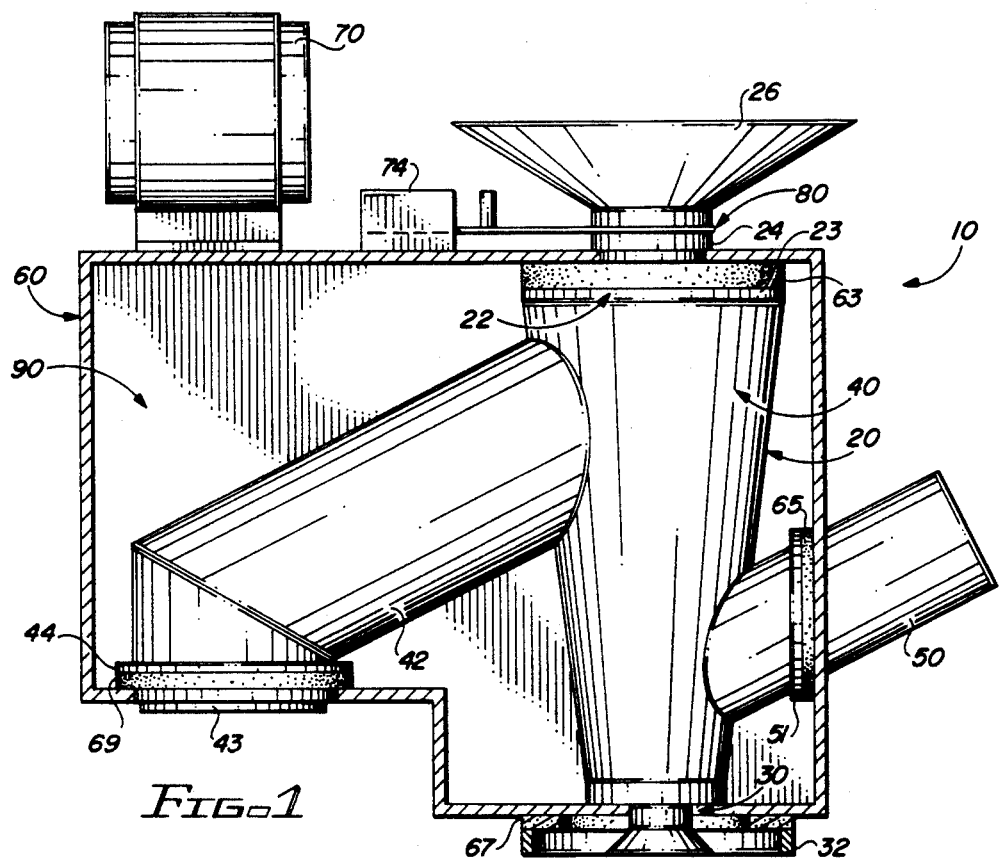
FIG. 1 is a detailed side view of the popcorn popping apparatus within its housing.
Figure 2:
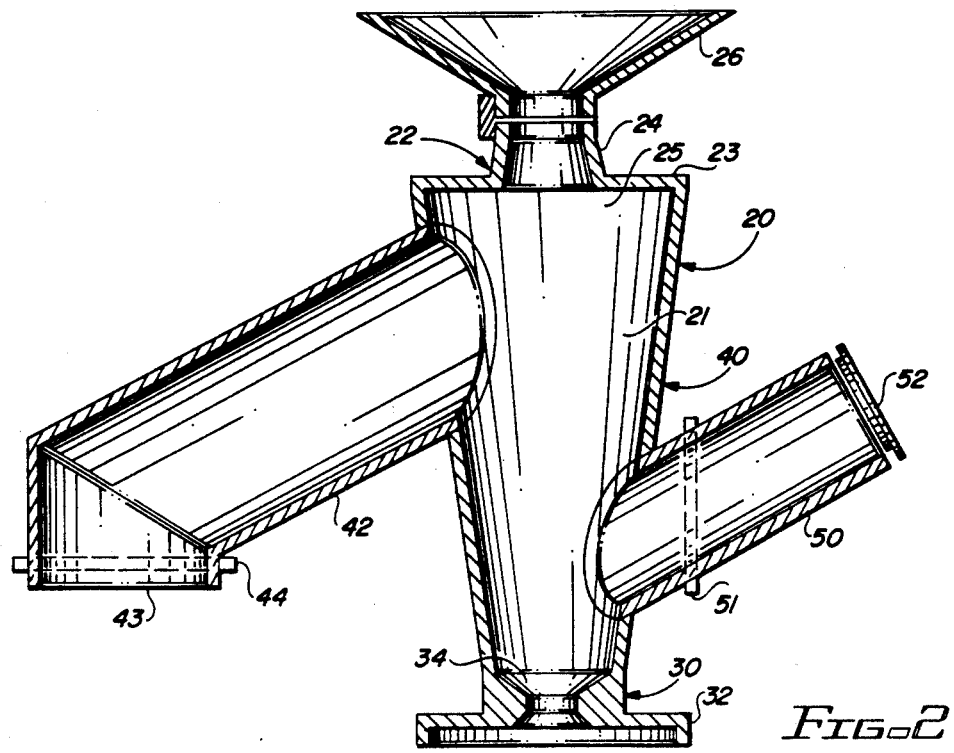
FIG. 2 is a cross-sectional view of the popcorn popping and dispensing apparatus.

Referring to FIG. 1, the popcorn popping and dispensing apparatus 10 includes primarily a dispensing chamber 20 and an outer housing 60, in the preferred embodiment. The popping chamber 20, best detailed in FIGS. 1 and 2, includes primarily a top 22, a base 30, and a surrounding side wall structure 40. The top 22 includes an angled neck portion 24 extending herefrom which defines a drop chute which as a result of its angle will not allow popcorn to become jammed therein. Concentrically disposed through the drop chute 24 is an opening 25 which directs unpopped kernels passing through the drop chute 24 into an inside 21 of the popping chamber 20. Secured atop the neck portion 24 is a funnel section 26. The funnel section 26 and the neck portion 24 are separated from one another by a pivotally mounted cover blade 80, thereby allowing large quantities of unpopped kernels to be stored and then subsequently dropped into the funnel section 26 and thereafter released upon pivotal movement of the cover blade once the kernels have been deposited in the housing, the cover blade moves into covering relation across the opening of the neck portion thereby preventing the escape of hot air and popped kernels.

The base 30 includes a centrally disposed opening 34 defining an air nozzle. The air nozzle 34 is structured and disposed to enable hot air directed from a hot air source connectable at a flanged collar 32 of the base 30, to be directed into the interior 21 of the popping chamber 20, thereby causing kernels therein to pop.

Extending from the surrounding side wall structure 40, and attached at an upper portion thereof, is a discharge chute 42. The discharge chute 42 is downwardly angled such that popped popcorn may be easily directed therein and be dispensed at a distal end 43 of the discharge chute 42. Further attached to the surrounding side wall structure 40 is a cleaning chute 50. The cleaning chute 50 is positioned at a lower portion of the surrounding side wall structure 40 and is angled upwardly. The cleaning chute is structured and disposed to keep popped popcorn from entering it and to facilitate the insertion of a cleaning equipment such as a vacuum therethrough to thoroughly clean the interior 21 of the popping chamber 20. Additionally, the cleaning chute 50 includes a plug 52 positioned so as to present popcorn which may enter the cleaning chute 50 from escaping therethrough.

Figure 3:
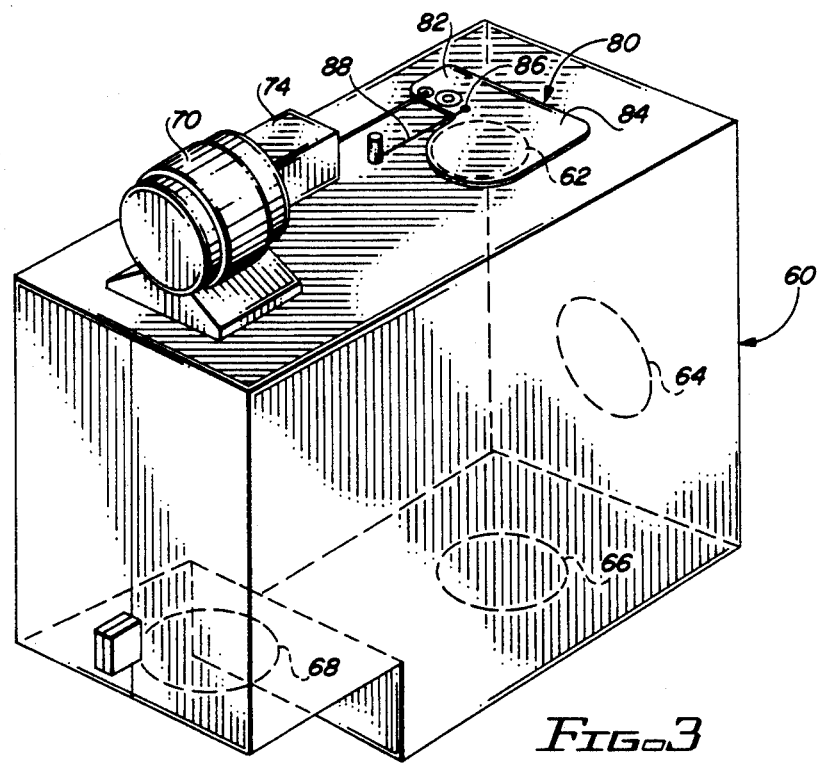
FIG. 3 is a perspective view of the popcorn popping and dispensing apparatus housing.

Surrounding the popping chamber 20 and supportably containing it therein is an exterior housing 60, as best seen in FIG. 3. The exterior housing 60 includes a plurality of openings 62, 64, 66, and 68 structured and disposed to correspondingly receive the top 22, cleaning chute 50, base 30, and dispensing chute 42 accessibly therethrough. Surrounding the top 22, cleaning chute 50, base 30, and dispensing chute 42 are a plurality of pressed cork gaskets 63, 65, 67, and 69. These gaskets 63, 65, 67, and 69 are structured and disposed to prevent direct contact between the popping chamber 20 and the housing 60, thereby preventing excessive heat transfer to the housing. In order to secure the gasket 63, 65, and 69, in appropriate positions within the housing 60, the top 22, cleaning chute 50, and dispensing chute 42 include protruding rims 23, 51, and 44 to maintain the gaskets 62, 65, and 69 properly and securely positioned. Further included within the housing 60 is an insulative material 90. The insulative material 90, which may be cork or wood chips, is disposed about the popping chamber 20 so as to isolate the popping chamber 20 from heat loss and increase the efficiency of the popping therein, and also function to further maintain the popping chamber 20 securely positioned within the housing 60.

Figure 4:
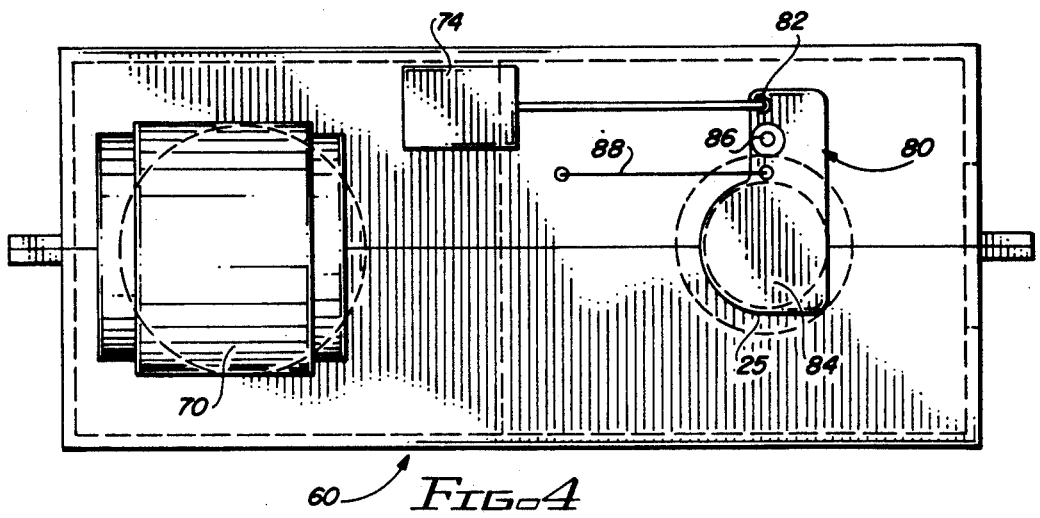
FIG. 4 is an overhead view of the popcorn popping and dispensing apparatus housing.

Positioned atop the housing 60, as best seen in FIGS. 3 and 4, is a vibrating motor 70. The vibrating motor 70 is structured so as to cause the housing 60 and the popping chamber 20 to vibrate, thereby making popped popcorn contained in the interior of the popping chamber to be directed into the dispensing chute 42 for dispensing to a consumer. Further included atop the housing 60 is a solenoid switch 74. The solenoid switch 74 which may be coin activated is connected to a distal end 82 of the cover blade 80. The cover blade 80 which normally includes a proximate end 84 in covering relation over the opening 25 in the top 22, is pivotally mounted on a mounting joint 86. When activated, the solenoid 74 causes the distal end 82 of the cover blade 80 to be pulled towards it and pivot about the mounting joint 86, thereby uncovering the opening 25 and causing a predetermined quantity of unpopped kernels to pass through the opening 25 and into the interior 21 of the popping chamber 20. In order to return the cover blade 80 into its normal covering relation over the opening 25, a spring 88 is disposed to pull back the cover blade when the solenoid switch 74 is disengaged. Accordingly, predetermined servings of popcorn may be easily dispensed into the popping chamber 20 for fresh popping and dispensing to a consumer on request.

Now that the invention has been described,

What is claimed is:

1. A popcorn popping and dispensing apparatus adapted for use in combination with a hot air source, said apparatus comprising:

a popping chamber including a base, a top, and a surrounding side wall structure, said base including mounting means structured and disposed for attachment of said hot air source thereto, said base further including an opening centrally disposed therethrough defining an air nozzle and structured to allow passage of forced hot air through from said hot air source into an interior of said popping chamber, a hollow neck portion extending from said top having an open distal end, said neck portion defining a drop chute structured and disposed for passage of popping corn kernels therethrough and into said interior of said popping chamber, for exposure to said forced hot air and subsequent popping, a discharge chute attached to and extending angularly downward from an upper portion of said side wall structure, and being structured and disposed for passage of popped popcorn therethrough and out from an open end thereof, and a cleaning chute attached to and extending angularly upward from a lower portion of said side wall structure being structured and disposed to facilitate insertion of cleaning instruments therethrough and into said interior of said popping chamber for cleaning thereof.

2. An apparatus as recited in claim 1 including a funnel section attachable to said open end of said neck portion so as to facilitate the insertion of the unpopped popcorn kernels into said interior of said popping chamber and to contain quantities of the unpopped popcorn kernels prior to insertion into said popping chamber.

3. An apparatus as recited in claim 2 having a housing including a bottom, a top, and four side walls structured to support and enclose said popping chamber, discharge chute, and cleaning chute therein.

4. An apparatus as recited in claim 3 wherein said housing includes a plurality of openings therein, each of said openings being structured and disposed to correspondingly receive said neck portion, said base, said discharge chute, and said cleaning chute therethrough.

5. An apparatus as recited in claim 4 including a vibrating motor mounted to said top of said housing and structured and disposed for vibrating said popping chamber thereby causing said popped popcorn to be directed out through said discharge chute.

6. An apparatus as recited in claim 5 including a solenoid switch attached to an upper surface of said housing and being structured and disposed to pull a distal end of a cover blade, when activated, thereby causing said cover blade, which includes a proximate end disposed in overlying, covering relation over said drop chute, to pivot about a mounting joint and uncover said drop chute, thereby allowing a predetermined quantity of the unpopped kernels to drop into said popping chamber.

7. An apparatus as recited in claim 6 wherein an interior diameter of said drop chute progressively increases from said open end to said top end of said popping chamber, and is structured to prevent jamming of said popped popcorn therein.

8. An apparatus as recited in claim 7 wherein said neck portion, said discharge chute, and said cleaning chute include a protruding exterior rim structure and disposed to enable a pressed corked gasket to be fitted between each of said rims and each of said corresponding openings in said housing, thereby preventing direct contact between said popping chamber and said housing.

9. An apparatus as recited in claim 8 wherein said mounting means includes flanged collar structured and disposed for mating engagement with a flanged collar on said hot air source.

10. An apparatus as recited in claim 9 wherein said cleaning chute may be sealed when not in use to prevent popcorn from getting contained therein.

11. An apparatus as recited in claim 10 including insulating material disposed in said housing about said popping chamber, thereby minimizing heat loss from the popping chamber and maximizing the popping efficiency thereof.

* * * * *